United States Patent
Duan et al.

(10) Patent No.: US 8,315,205 B2
(45) Date of Patent: Nov. 20, 2012

(54) WIRELESS STAR NETWORKS WITH DUAL ADAPTIVE CENTRAL NODES

(75) Inventors: Chunjie Duan, Medfield, MA (US);
Jianlin Guo, Malden, MA (US);
Zhifeng Tao, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 445 days.

(21) Appl. No.: 12/651,474

(22) Filed: Jan. 3, 2010

(65) Prior Publication Data
US 2011/0164556 A1 Jul. 7, 2011

(51) Int. Cl.
*H04W 28/16* (2009.01)
*H04J 1/16* (2006.01)

(52) U.S. Cl. .......... 370/328; 370/221; 370/338

(58) Field of Classification Search ............. 370/328, 370/350, 219, 220, 445, 447, 227, 228, 241, 370/242
See application file for complete search history.

(56) References Cited

U.S. PATENT DOCUMENTS

| | | | | |
|---|---|---|---|---|
| 5,594,731 A | * | 1/1997 | Reissner | 370/338 |
| 2004/0136318 A1 | * | 7/2004 | Bentley | 370/221 |
| 2008/0261641 A1 | * | 10/2008 | Tang et al. | 455/517 |

* cited by examiner

*Primary Examiner* — Ian N Moore
*Assistant Examiner* — Thai Nguyen
(74) *Attorney, Agent, or Firm* — Dirk Brinkman; Gene Vinokur

(57) ABSTRACT

A wireless network with a star topology has a first and second central node. The first central node starts up first and initiates the network. The second central node starts up second and synchronizes to the first central node, and wherein one node is in active mode and the other node is in standby mode, and a set of leaf nodes configured to communicate only with the active node.

6 Claims, 7 Drawing Sheets

WIRELESS STAR NETWORKS WITH DUAL ADAPTIVE CENTRAL NODES

FIELD OF THE INVENTION

This invention relates to wireless communication networks, and more particularly, to wireless communication networks with dual adaptive central nodes.

BACKGROUND OF THE INVENTION

A conventional star network includes a central node, (e.g., WiFi access point, WiMAX base station), and multiple leaf nodes (e.g., laptop computers) associated with the central node. The leaf nodes can only transmit to and receive from the central node directly. Communications between two leaf nodes associated with the same central node has to go through the central node. Therefore, the network forms a graph with a topology of a star.

A star network has many advantages. At most three nodes and two links (channels) are involved in any communication between any two nodes within the network. Therefore, performance is predictable.

The central node has total control of both access and resources. The central node coordinates the operations of all the leaf nodes in the network. Therefore, the central node can reduce or eliminate any collision and conflict between leaf nodes.

The capacity of the network can be expanded by only increasing capacity of the central node. The centralized nature also allows the monitoring of traffic through the network to determine unusual behavior. The simple star topology obviates the need for complex routing or message passing protocols.

One disadvantage of a start topology, however, is the dependence on the central node. The central node becomes the performance bottleneck, and can also be a cause of a single point of failure. The failure of the central node renders the entire network inoperable and therefore greatly reduces the network availability performance. In addition, the performance and scalability of the network depend on the capabilities of the central node.

Another disadvantage of the star topology is that each leaf node is connected to the network only by the link to the central node. If the individual link between a leaf node and central node becomes unreliable, the leaf node cannot communicate properly with other nodes in the network. The failure of an individual link between the center node and leaf nodes results in the isolation of the leaf node.

FIG. 1 shows a conventional wireless star network 100. The network includes a central node C 101, and leaf nodes Ln 102, where n$\in\{1, 2, \ldots, N\}$, where N is a maximal number of leaf nodes in the network. The central node and each leaf node are directly connected by a wireless link 120. The leaf nodes do not communication directly with each other. Communications between leaf nodes is via the central node. For instance, L1-C-L5 is the path for data transmitted from L1 to L5.

A standby central node can be added to the conventional star networks. The standby central node can enhance star network reliability and system availability. In the event of a failure of an active central node, the standby central node switches from standby mode to active mode, and resumes the operation of the failed active nodes and provides services with little or no interruption. The standby central node can also be available to assist data delivery between the active central node and the leaf nodes.

However, the standby central node has its disadvantages. During normal operation, the standby central node does not perform all the functions of the active central node. Its main role is to monitor the transmission by the active central node and leaf nodes. In the case of the active central node failure, it is not guaranteed that the standby central node can operate network properly. For example, the standby central node does not have full picture of the network. It does not know how many leaf nodes are in the network. There is no guarantee that the standby central node has reliable links with all leaf nodes in the network.

Another disadvantage of the standby central node is bandwidth inefficiency. The bandwidth allocated to the standby central node is wasted while network operates normally.

Another disadvantage is that the work load between the active central node and the standby central node is unbalanced while the network operates in normal mode.

FIG. 2 shows a conventional wireless star network 200 with active central node AC 101, a standby central node SC 201 and leaf nodes Ln 102. The active central node AC and each leaf node are directly connected by a wireless link 120. The standby central node SC and each leaf node are directly connected by a wireless link 220. Two central nodes 101, 201 are connected to each other by another link 204.

SUMMARY OF THE INVENTION

The embodiments of the invention provide a structure and operation a wireless network with a start topology. The network includes two (or more) central nodes functioning equally, in addition to the leaf nodes. The network provides very high reliability, system availability and bandwidth efficiency. The invention also provides a media access control (MAC) frame structure. The invention also provides protocols for two central nodes to switch their operational modes, alternatively. Transmission power control mechanism with two equally functioning central nodes is provided. A network management scheme with two equally functioning central nodes is also provided.

DETAILED DESCRIPTION OF THE PREFERRED EMBODIMENTS

Figure 1:
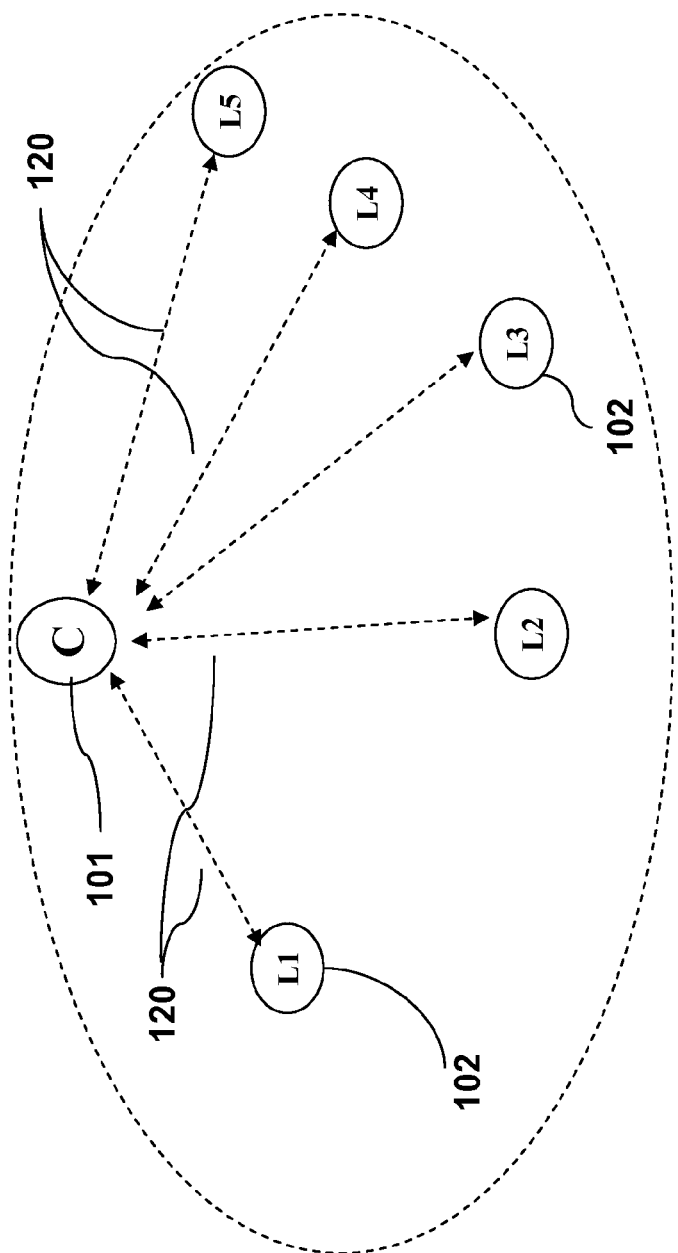
FIG. 1 is a schematic of a prior art star network with a single central node and multiple leaf nodes.
Figure 2:
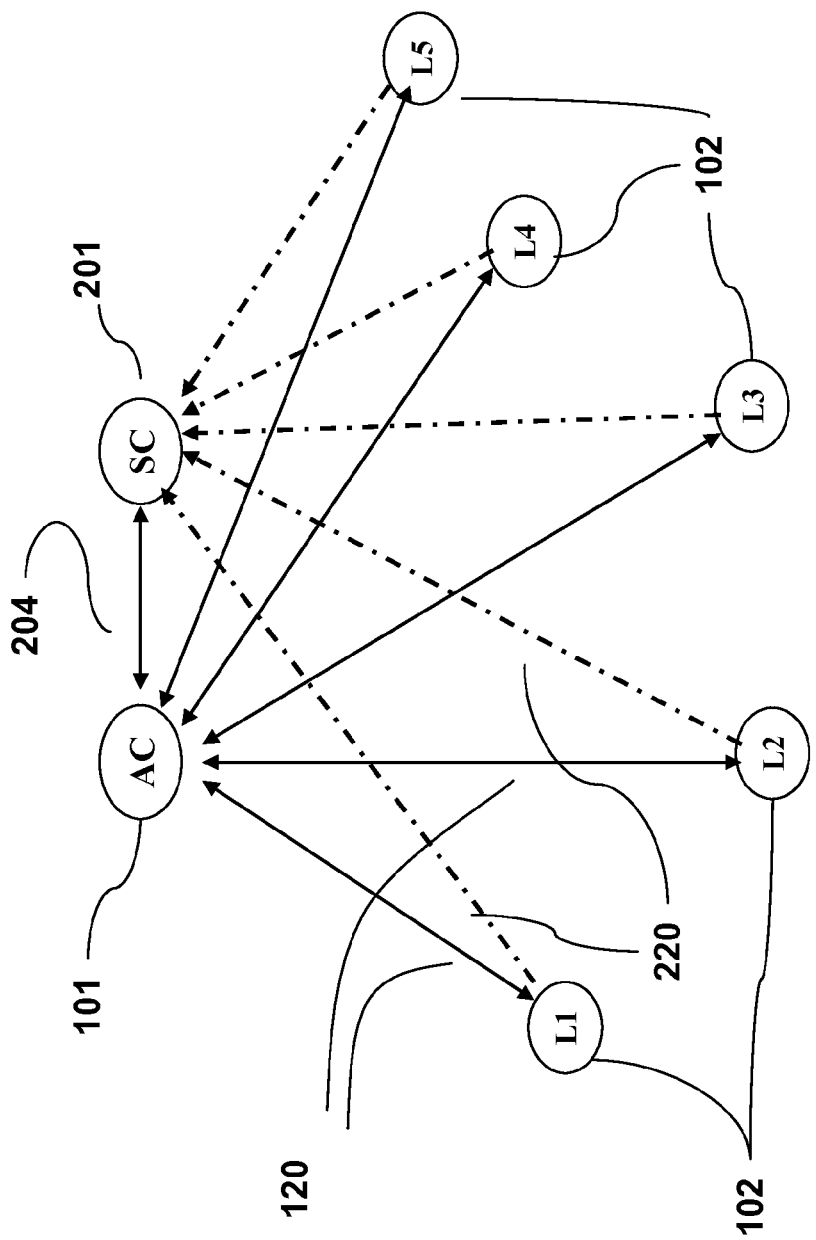
FIG. 2 is a schematic of a prior art star network with a single central node, a standby central node and multiple leaf nodes.
Figure 3:
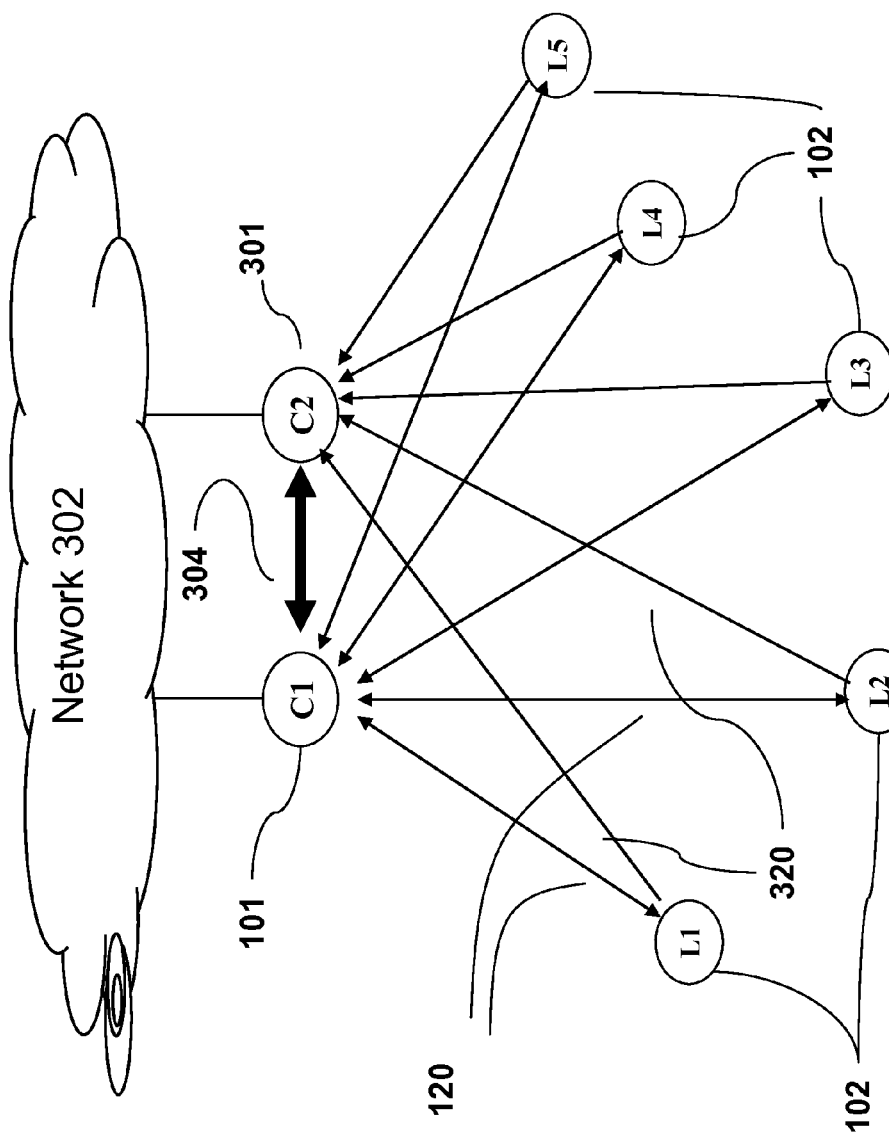
FIG. 3 is a schematic of a star network with two equally functioning central nodes and multiple leaf nodes according to embodiments of the invention.

FIG. 3 shows a star network 300 according to embodiments of our invention. The network includes two central nodes C1

101, C2 301 and leaf nodes Ln 102. The central nodes C1 and C2 are functionally equal and communicate with each other via wired or wireless link 304. Each leaf node 102 connects to the network 302 by two wireless links 120 and 320. Each link includes an uplink (UL) and a downlink (DL)

Operation Modes of the Central Nodes

For each superframe, only one central node is transmitting in the DL1 and is defined as operating in active mode. The other central nodes are defined as in standby mode during the superframe.

Figure 4:
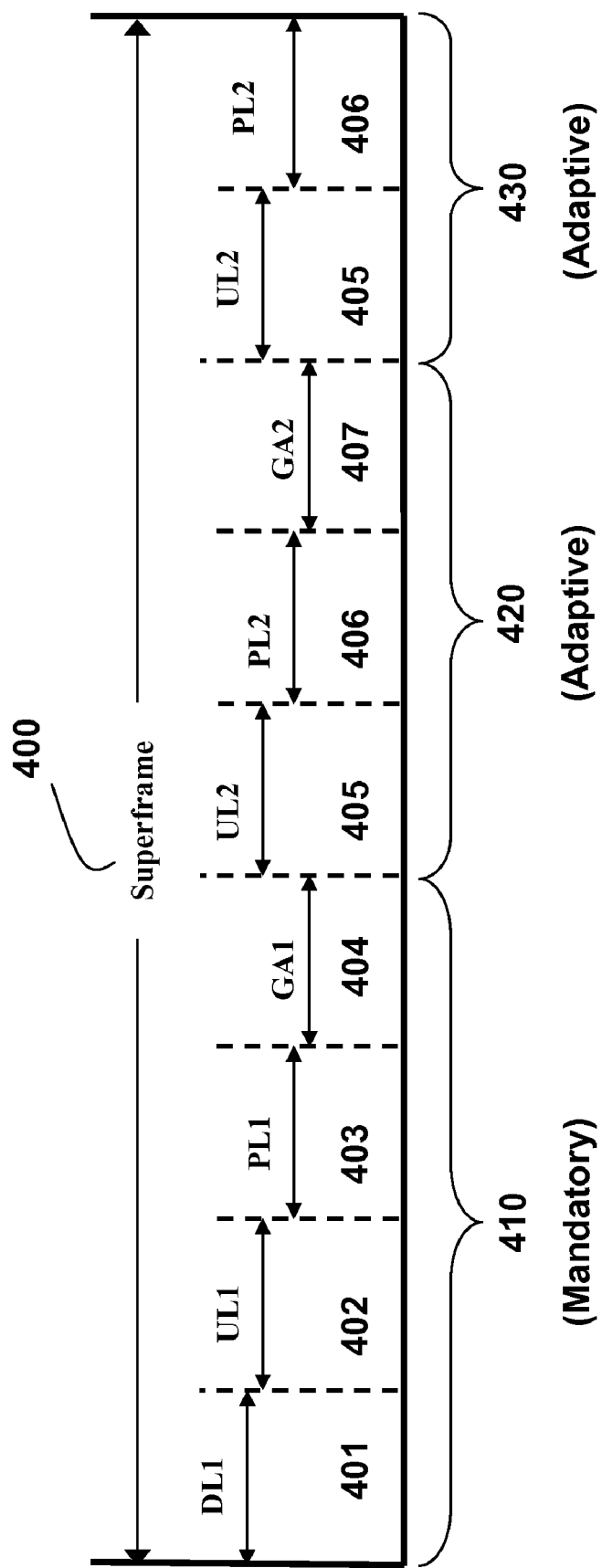
FIG. 4 is a block diagram of a MAC superframe structure for the star network according to embodiments of the invention.

FIG. 4 shows a superframe 400. One superframe includes multiple mandatory slots 410, and multiple adaptive slots 420 and 430. The length (duration) of the superframe is variable depending on the number of adaptive slots. If the active central node terminates the superframe at the end of mandatory slots 410, there are no adaptive slots 420 and 430. If the active central node terminates the superframe in the end of adaptive slots 420, there will be no adaptive slots 430.

In downlink slot DL1 401, the active central node transmits downlink data. All leaf nodes and the central node in standby mode receive the data. The downlink data contains messages such as uplink channel assignments for the leaf nodes that have successfully joined network and necessary network control information for new leaf nodes to join the network.

In uplink slot UL1, all leaf nodes that have successfully joined the network transmit uplink data on assigned uplink channels. New leaf nodes transmit joining request on selected uplink channels that have not been assigned to any leaf node. The central nodes receive uplink data in slot UL1. In central-central link slot PL1, the standby central node transmits a message. The active central node and the leaf nodes can or can not receive what is transmitted by the standby central.

The message transmitted during PL1 can include a report of a current state. When the new central node starts up and synchronizes to the existing central node, the new central node transmits a request to the existing central node to perform the active central node role. This request specifies an exact superframe in which the central node switches to the active mode. The active central node transmits a response in the group acknowledge slot GA1. The new central node does not become active before the reception of the acknowledgement.

The slot PL1 can also be used by the standby central node to relay data between the active central node and leaf nodes. For example, if a leaf node has an unreliable uplink with the active central node, then the standby central node can relay the uplink data for that leaf node in slot PL1. The standby central node can also relay downlink data to leaf nodes that have unreliable downlink connection with the active central node. In this case, corresponding leaf nodes also receive.

In slot GA1, the active central node transmits a group acknowledgement (GA) to all leaf nodes, and the standby central node. Therefore, all leaf nodes and the standby central node receive in slot GA1. Most important, the GA1 can be a superframe termination indicator.

If communications in slots DL1, UL1 and PL1 are all successful, the active central node includes a superframe termination signal in the group acknowledgement and switches to standby mode. Then, the superframe terminates. In the case that GA1 is not received correctly by the standby central node, the central node simply waits until the start of the next frame to transmit in slot DL1.

At the end of mandatory period 410, if any retransmission is necessary, the adaptive period 420 start.

In slot UL1, if any leaf node indicates that the leaf node did not successfully receive downlink data transmitted in slot DL1, then the active central node includes the retransmission of downlink data for that leaf node in slot GA1.

If the group acknowledgement indicates that the active central node did not correctly receive uplink data from any leaf nodes transmitted in slot UL1, then these leaf nodes retransmit their uplink data in slot UL2, while both central nodes C1 and C2 receive.

Slot PL2 can be used by the standby central node to relay data between the active central node and leaf nodes, or make its own transmission to the active central node. The active central node receives and leaf nodes can receive in slot PL2.

Slot GA2 is used by the active central node to transmit the group acknowledgement for the transmission performed in slot UL2 and PL2 with standby central node and some leaf nodes receiving. If transmissions are successful in slots UL2 and PL2, then the active central node indicates the termination of the superframe in GA2. No adaptive slots 430 are needed.

Figure 5:
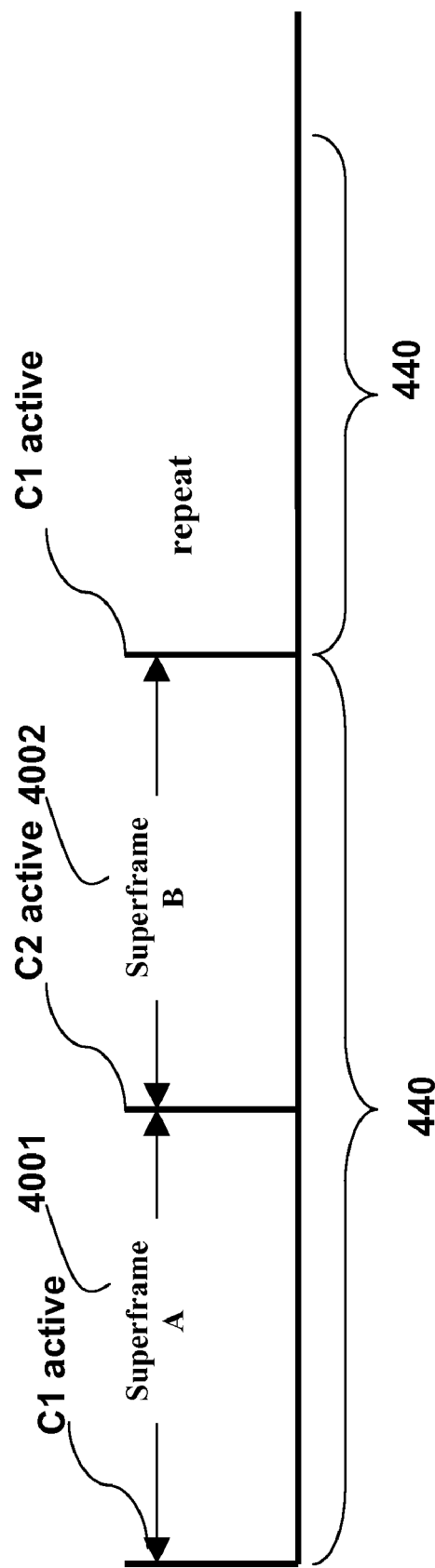
FIG. 5 is a block diagram of two superframes operated by two central nodes alternatively according to embodiments of the invention.

FIG. 5 shows a balanced superframe transmission structure for two central nodes C1 and C2. In such a transmission scheme according to embodiments of the invention, the central nodes C1 and C2 act alternatively as the active node. During superframe 4001, C1 is active and C2 is standby mode. During superframe 4002, C2 is active and C1 is in standby mode. Therefore, in two consecutive superframes, the transmitting nodes for DL1, DL2, PL1, PL2, GA1, GA2 are different. We differentiate two consecutive superframes as superframe A and superframe B.

Transmission Power and Receiver Gain Control with Dual Central Nodes

Figure 6:
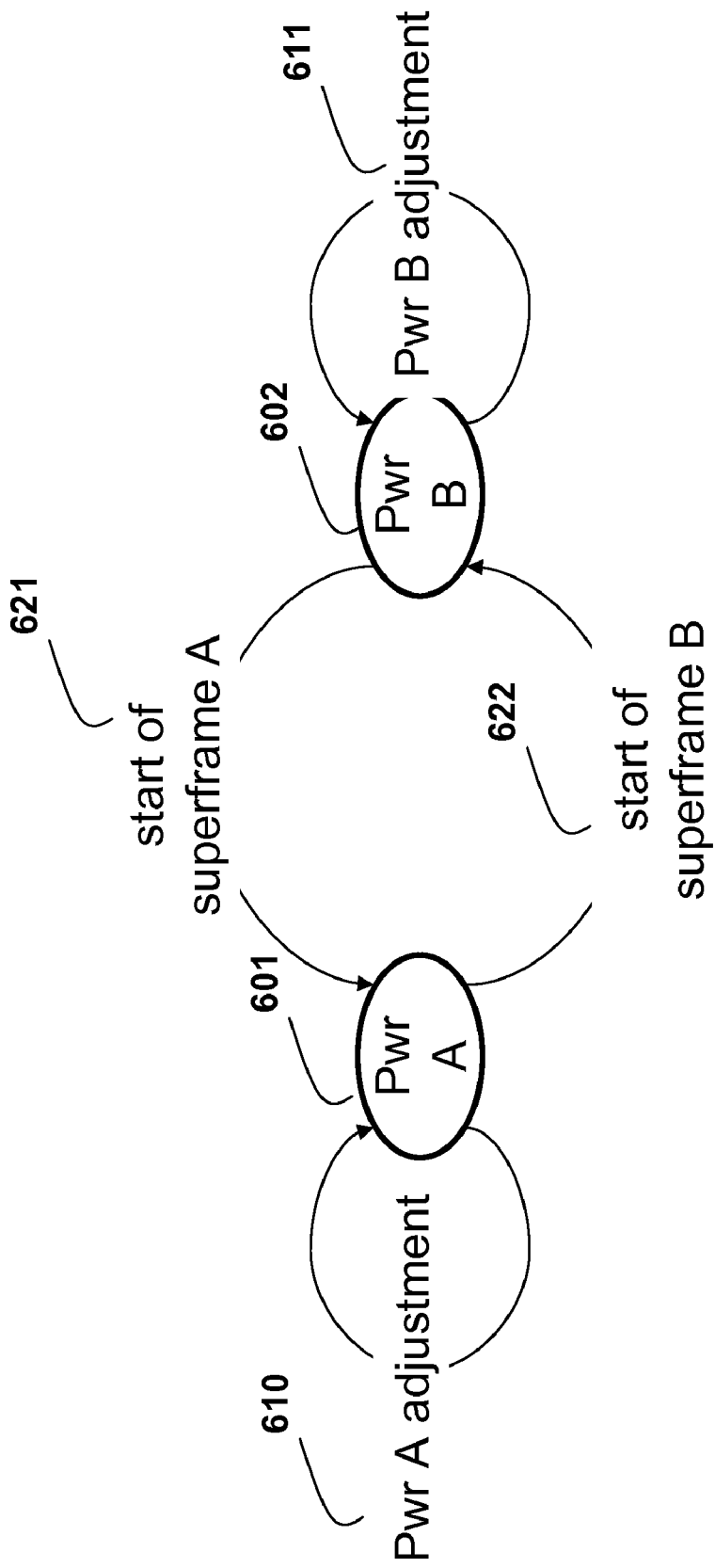
FIG. 6 is a block diagram of a leaf node transmission power control with two equally functioning central nodes according to embodiments of the invention.

FIG. 6 depicts a power control finite state machine 600 for the leaf nodes. A leaf node maintains two independent power gain values 601-602. Each value is used to control the TX power during one of the two types of superframes. That is, during superframe A, the leaf node transmits at power level PWR_A 601; and during superframe B, the leaf node transmits at power level PWR_B 602.

Based on the downlink control signaling information received in DL1, each leaf node can determine whether the active central node is C1 or C2 during the current frame, and then select the corresponding power parameter setting accordingly for uplink transmission. PWR_A and PWR_B are respectively adjusted 610-611 independently. PWR_A is adjusted based on the power control command received during superframe A 621 and PWR_B is adjusted based on the power control command received during superframe B 622.

The advantage of two independent power control loops is to explore the different characteristics of the wireless links between leaf nodes and two different central nodes. PWR_A and PWR_B are adjusted such that receptions are optimal at central node C1 and C2 respectively.

Figure 7:
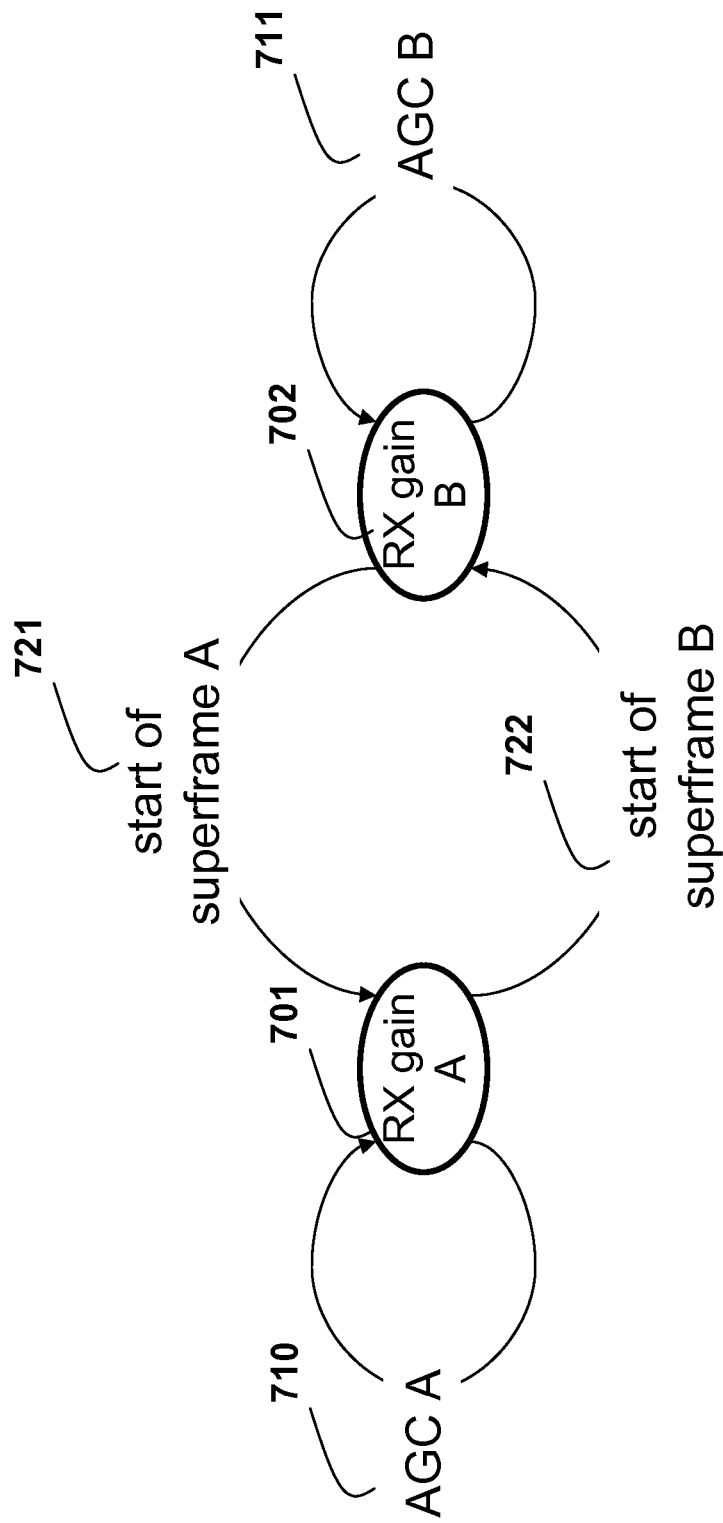
FIG. 7 is a block diagram of a leaf node receiver gain control with two equally functioning central nodes according to embodiments of the invention.

Similarly as shown in the finite state machine 700 in FIG. 7, each leaf node maintains two independent receiver gain control loops 701-702. The gain control process is synchronized to the start of superframes. At the start 721 of superframe A, the first automatic gain control (AGC) loop 710 is active and the receiver gain is controlled by the value generated it. The second AGC loop is inactive and its gain value holds during the period. At the start 722 of superframe B, the second AGC loop becomes active and adjusts the gain value. During this period, the first AGC loop is inactive and hold is value.

Network Management with Two Central Nodes

The central nodes in the network are configured with a set of common network parameters such as network identifier (ID), and the number of leaf nodes allowed in the network. Each central node is configured with a node ID. The network ID uniquely identifies the network, and node ID uniquely identifies the node within the network.

The first central node that is activated forms the network by broadcasting network parameters and accepting leaf nodes into the network. This central node is in active mode until next central node joins network. A central node activated after a network has been formed synchronizes to the first central node before performing any operations.

To avoid a conflict, a central node first monitors all channels when the node is activated. If there is no transmit activity, the node forms the network. If the network is initiated, the central node synchronizes to network. Then, the node communicates with other central node using link 304 in PL1 to negotiate when the nodes will be in active or standby modes them.

After the negotiation completes, two central nodes take an active role alternatively as shown in FIG. 5. The two central nodes switch between active mode and standby mode alternatively. For additional central nodes, the nodes can switch in a rotational manner.

If a failure is detected from one central node, other central node can switch to active mode.

Upon entering the network, a leaf node first monitors the channels and obtains network configuration parameters. Before initiating the network joining process, a leaf node identifies the number of central nodes in the network, because different central nodes have different uplink channel assignments. The leaf node also needs to identify which central node is active while the leaf node transmits uplink data.

To join a network, a leaf node synchronizes to the central node(s) and selects an uplink channel that is not assigned to any other leaf nodes.

Then, the leaf node transmits a request on selected uplink channel to join the network. The request is received by all central nodes. In response to receiving a request from a leaf node, the active central node transmits to requesting leaf node in downlink data. A request can be accepted or rejected. If accepted, then the requesting leaf node starts to perform normal operations. The standby central node monitors the downlink data and updates its leaf node information accordingly so that all central nodes have identical network information.

If the network is not operating at full capacity, the central nodes can select some uplink channels only for network joining purposes. To avoid network joining collision, a random backoff mechanism can be applied. After transmitting the request, if no response is received, then the leaf node can perform a random backoff before to transmitting the next joining request.

If a leaf node detects multiple networks, then one network can be selected for joining.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A wireless network with a star topology, comprising:
a first central node configured to initiate a network;
a second central node configured to synchronize to the first central node and the network via a link, wherein only one of the central nodes operates as an active central node at any one time, such that the active central node is switched alternatively between the first central node and the second central node during a duration of one superframe; and
a set of leaf nodes configured to communicate with the active central node, wherein the first central node and the second central node control leaf node transmission power independently, and the set of leaf nodes maintain two independent transmission power gain values, wherein each power gain value is used to control a transmission power according to the active central node during a superframe.

2. The network of claim 1, wherein the central nodes are base stations, and the leaf nodes are mobile stations.

3. The network of claim 1, wherein each leaf node maintains two independent receiver gain control loops, and wherein at a start of a superframe A, a first automatic gain control (AGC) loop is active and a receiver gain is controlled by a value generated by the leaf node, a second AGC loop is inactive and wherein the gain value holds during a period, and wherein at a start of a superframe B, the second AGC loop becomes active and adjusts the gain value, the first AGC loop is inactive and holds the value during the period.

4. The network of claim 1, wherein two central nodes manage a common network, wherein the first central node initializes network formation and the second central node synchronizes to the first central node and then performs network management with the first central node, the two central nodes have identical leaf node information, and the leaf nodes transmit network joining requests to either central node, either central node transmits joining response to requesting leaf node.

5. A method for operating a wireless network with a star topology, comprising the steps of:
initiating a network by a first central node;
synchronizing a second central node to the first central node and the network via a link, wherein only one of the central nodes operates as an active central node at any one time, such that the active central node is switched alternatively between the first central node and the second central node during a duration of one superframe; and
communicating, by a set of leaf nodes, only with the active central node, wherein the first central node and the second central node control leaf node transmission power independently, and the set of leaf nodes maintain two independent transmission power gain values, wherein each power gain value is used to control a transmission power according the active central node during a superframe.

6. A wireless network with a star topology, comprising:
a first central node configured to initiate a network;
a second central node configured to synchronize to the first central node and the network node, via a link, wherein only one of the central nodes operates as an active central node at any one time; and
a set of leaf nodes configured to communicate with the active central node wherein each leaf node maintains two independent receiver gain control loops, and wherein at a start of a superframe A, a first automatic gain control (AGC) loop is active and a receiver gain is controlled by a value generated by the leaf node, a second AGC loop is inactive and wherein the gain value holds during a period, and wherein at a start of a superframe B, the second AGC loop becomes active and adjusts the gain value, the first AGC loop is inactive and holds the value during the period.

* * * * *